United States Patent

[11] 3,600,546

[72] Inventors: Toshio Niwa, Osaka; Yasuo Kimoto, Osaka; Katsunori Tamiya, Kobe; Hisashi Okamura, Osaka, all of, Japan
[21] Appl. No.: 851,556
[22] Filed: Aug. 20, 1969
[45] Patented: Aug. 17, 1971
[73] Assignee: Hitachi Shipbuilding and Engineering Co. Ltd. Nishi-ku, Osaka, Japan
[32] Priority: Aug. 23, 1968, Aug. 23, 1968, Aug. 23, 1968, Aug. 23, 1968
[33] Japan
[31] 43/60762, 43/60759, 43/60761 and 43/60760

[54] ELECTRICAL DISCHARGE TREATMENT AND MACHINING APPARATUS
7 Claims, 9 Drawing Figs.
[52] U.S. Cl. ................................................ 219/69 M, 219/69 D
[51] Int. Cl. ........................................................ B23p 1/08
[50] Field of Search ............................................ 219/69 D, 69 E, 69 M, 69 P, 69 V

[56] References Cited
UNITED STATES PATENTS

| | | | |
|---|---|---|---|
| 2,974,215 | 3/1961 | Inoue | 219/69 V X |
| 3,145,286 | 8/1964 | Fehling et al. | 219/69 M |
| 3,158,728 | 11/1964 | Webb | 219/69 P |
| 3,240,914 | 3/1966 | Hill et al. | 219/69 M |
| 3,333,080 | 7/1967 | DeVries | 219/69 M |

Primary Examiner—R. F. Staubly
Attorney—Dawson, Tilton, Fallon & Lungmus

ABSTRACT: A method of electrical discharge machining employs a sugar mill roll as a cathode and an electrode for performing treatment serving as an anode. Water is injected therebetween and concurrently therewith repetitive transient arc discharges are effected, whereby the grooved surface of the roll is provided with satin finish. The electrode can be a turner or scraper plate which is machined with the roll serving as the tool electrode and subsequently employed with the roll as a mill.

PATENTED AUG 17 1971  3,600,546

ELECTRICAL DISCHARGE TREATMENT AND MACHINING APPARATUS

The present invention relates to a method of electrical discharge treatment and machining and more particularly to a method of electrical discharge treatment and machining to be used in treating the surface of a sugar mill roll, in machining the electrode for treating the roll surface and in machining a turner plate and a scraper to be employed with the roll.

In extracting sugar juice from sugarcane for the manufacture of sugar, a pair of upper and lower rollers is employed. However, there is a drawback that the grooves formed on the roll surfaces are gradually worn off by the fibers of sugarcane as if subjected to abrasion to cause the slippage of the sugarcane and thereby impair the efficiency of sugar juice extraction. In order to overcome such defect, a proposal was made in which several large grooves for drawing in the sugarcane were provided in the roll surface at a predetermined angle with the above mentioned grooves, but the slippage of the sugarcane could not substantially be eliminated by the proposed structure. On the contrary, some of the sugarcane fibers were left unsqueezed due to the provision of the large grooves, which resulted in the deterioration of extraction efficiency to the corresponding extent.

An object of the present invention is to provide a method for effecting satin finish treatment on the surface of a sugar mill roll which is capable of increasing the coefficient of friction on the roll surface and imparting corrosion and wear-resisting properties to the surface of the roll to thereby improve the sugar juice extraction efficiency.

Another object of the present invention is to provide the surface of a sugar mill roll with satin finish in a short period of time and with ease.

Still another object of the present invention is to provide a method for machining by transference a treating electrode as well as a turner plate and a scraper to be used with the sugar mill roll to the shape identical with the shape of the grooves on the roll with ease and in a short period of time.

Still another object of the present invention is to provide a machining method for imparting durability to a turner plate and a scraper to be employed with the sugar mill roll.

These and other objects, features and advantages of the present invention will become apparent from the following description.

To sum up, the method of electrical discharge treatment and machining of the present invention comprises employing a sugar mill roll as a cathode and a treating electrode as an anode, providing water therebetween and effecting concurrently therewith repetitive transient arc discharges which are unidirectional and of an appropriate waveform.

The present invention will be fully understood from the following detailed description with reference to accompanying drawings, in which.

Figure 1:
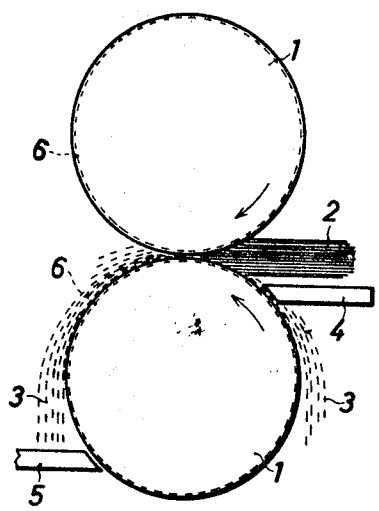
FIG. 1 is a diagrammatic side elevation showing a pair of sugar mill rolls as sugar juice is being extracted from the sugar cane.
Figure 3:
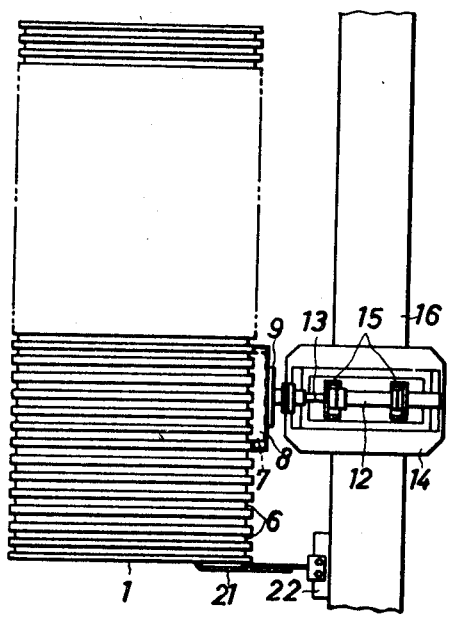
FIG. 3 is a plan view showing the electrical discharge treatment apparatus in FIG. 2.
Figure 4:
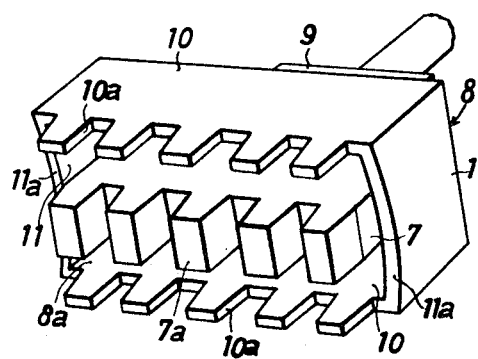
FIG. 4 is an enlarged perspective view showing a treating electrode and a water retainer in a box form.

Referring to FIG. 1, it will be seen that sugarcane 2 is squeezed between a pair of upper and lower sugar mill rolls 1, and sugar juice 3 is extracted. Instead of providing two rolls 1, 1, three rolls may be provided, one roll in an elevated position and two rolls, spaced apart from each other, disposed thereunder in contact therewith. Positioned in proximity to the lower roll 1 are a turner plate 4 on the sugarcane-feeding side an a scraper 5 on the opposite side. Formed in the surface of the roll 1 are grooves 6 for preventing the slippage of the sugarcane as shown in FIG. 3. As previously described, the grooves 6 are worn off by the fibers of the sugarcane 2, with the result that the efficiency of sugar juice extraction is impaired. The present invention contemplates eliminating this problem.

Figure 2:
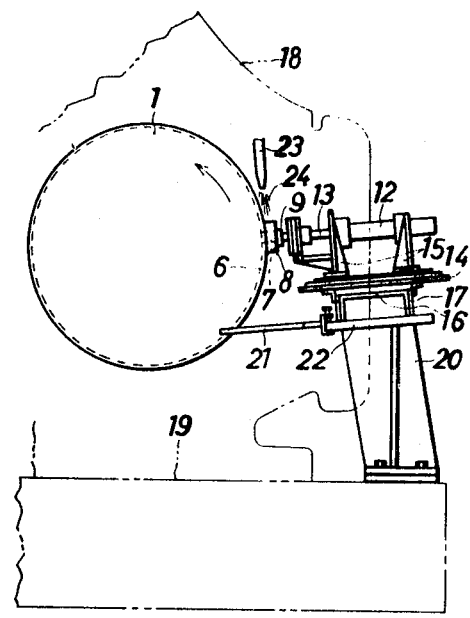
FIG. 2 is a diagrammatic side elevation of an apparatus for effecting electrical discharge treatment as the surface of a sugar mill roll is being treated to provide satin finish by applying the method of electrical discharge treatment in accordance with the present invention.

FIGS. 2 and 3 illustrate the electrical discharge treatment of the present invention as it is performed on the roll 1. The roll 1 serves as a cathode, and a treating electrode 7 having a portion 7a with projections and indentations in conformity with those of the roll 1 and serving as an anode is disposed at the side of the roll 1 in facing relation therewith with a predetermined gap for effecting discharge. The treating electrode 7 is housed in a water retainer 8 in the shape of a box and supported on a holder 9 together with the retainer. An opening 8a of the water retainer 8 faces to the roll 1, and rugged portions 10a corresponding to the projections and indentations of the roller 1 are formed along the forward edges of sidewalls 10 parallel to the axial direction of the roll 1. Concave arcuate portions 11a in conformity with the peripheral surface of the roll 1 are formed along the front edges of sidewalls 11 perpendicular to the axial direction of the roll 1. The electrode holder 9 is fixed to the end of a piston rod 13 of an oil cylinder 12 so that by operating the oil cylinder 12 the gap between the roller 1 and the treating electrode 7 may be adjusted to an appropriate distance to effect electrical discharges. The oil cylinder 12 is secured to support 15 mounted on a movable support plate 14 whose under face is provided with a fitting portion 17 in slidably fitting engagement with a rail 16 which is disposed parallel to the axial direction of the roll 1. The rail 16 is supported at a predetermined level by a stand 20 mounted on a base 19 for supporting the entire body of the sugar mill 18. Fixed to the stand 20 is a holder 22 for a brush 21 held in contact with one end of the roll 1. A water-ejecting nozzle 23 is disposed between the roll 1 and the treating electrode 7.

The roll 1 is slowly rotated in the counterclockwise direction in FIG. 2 and at the same time, water 24 is supplied from a nozzle 23. The water 24 is retained in the retainer 8, so that water 24 is present between the roll 1 and the treating electrode 7 all the time. In this state, electrical discharges are effected and the roll 1 is formed with a satin-finished surface 1a because of the reasons to be described later. When the roll 1 is brought into a turn of rotation, the treating electrode 7 is retracted by operating the cylinder 12 so that rugged portion 7a of the electrode may not strike against the roll 1 when moved sidewise, and the movable support plate 14 is thereafter moved sidewise manually by a distance corresponding to the length of the treating electrode 7. After the gap between the roll 1 and the treating electrode is adjusted, discharge treatment is performed as previously described. By carrying out this operation in succession, the entire body of the roll 1 is provided with satin finish. Although only one roll 1 is shown in FIG. 2, in case where the sugar mill has two or three rolls, 1, the same number of treating electrodes 7 are provided to effect satin-finishing treatment concurrently on two or more rolls.

Figure 6:
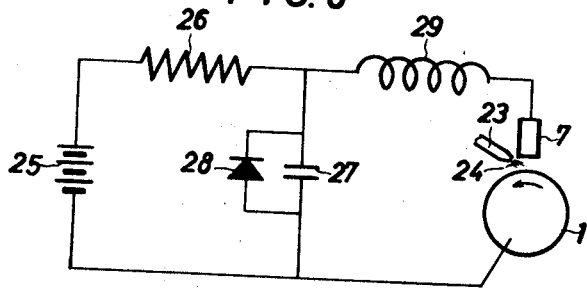
FIG. 6 is a diagram of a discharge circuit of capacitance type showing an example of the electric circuit to be used in the electrical discharge treatment of the present invention.

FIG. 6 shown an embodiment of the electric circuit require for generating transient arc discharge for a short period of time which is employed in working the present invention. In this drawing, designated at 25 is a direct current power source; at 26, a resistor; at 27, a capacitance; at 28, a rectifier; and at 29, a self-inductance. The roll 1 acting as a cathode, treating electrode 7 serving as an anode, water-ejecting nozzle 23 and flushing water 24 shown in FIG. 2 are schematically illustrated in FIG. 6. In this electric circuit, when the insulation between the roll 1, i.e. cathode and the treating electrode 7, i.e. anode, is broken a unidirectioned transient arc is produced, and the self-inductance or the capacitance, if varied, causes variations in the wave form of the discharge current. A satin-finished surface having roughness of approximately 2 Hrms. M$\mu$-in. is obtained with a capacitance of 8 $\mu$F, and roughness of approximately 10 Hrms. M$\mu$-in. is achieved with a capacitance of 200 $\mu$F.

In order to effect discharges at diffused points on the sugar mill roll surface and blow out or remove the metal at discharge points so as to improve treating effects, there is a need to provide water between the roll and the treating electrode. If no water is present between the roll and the electrode, aerial transient arc discharges take place therebetween. With such aerial discharges, it is impossible to fulfill the intended object of the present invention to provide satin finish over the entire roll surface, because aerial discharges occur at points of low distribution on the roll surface with repetitive discharges raking place concentrically. Furthermore, since the discharge points on the roll surface which are melted by joule heat produced by arc discharge are solidified again in the case of the aerial discharges, the grooved roll surface is susceptible to deformation and there is a possibility that the increase in coefficient of friction and improvements in resistance to wear and corrosion may not be achieved as intended by the invention.

As already described, it is required that the sugar mill roll be employed as a cathode and the treating electrode as an anode. The polarity, if reversed, causes leakage current to pass between the roll and the treating electrode through an electrolyte in the water to result in deposition of a large amount of anode products on the roll, and it becomes no longer possible to effect satisfactory surface treatment. In case where an oil having high insulating property is used in place of water so as to prevent the leakage of current, there arises a hazard to cause a fire, and moreover, the use of oil is not desirable since the roll is employed for the extraction of sugar juice which is is a food.

Figure 9:
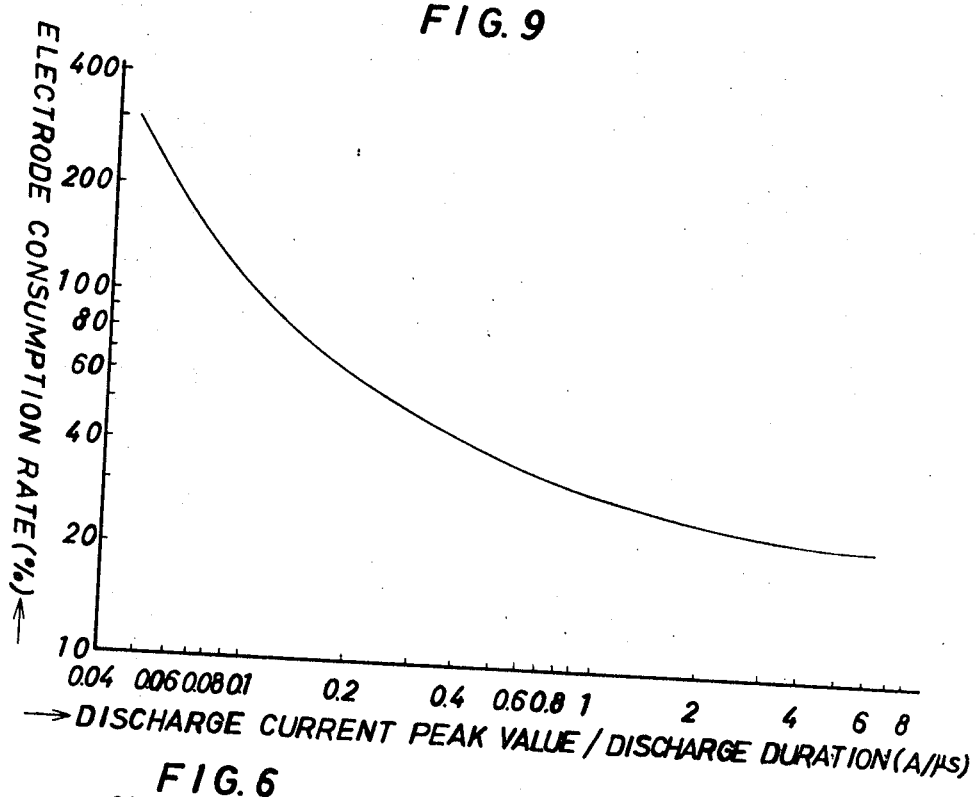
FIG. 9 is a curve graph representing the relationship between the discharge current peak value discharge duration and the electrode consumption rate.

By carrying out electrical discharge treatment with the electric circuit shown in FIG. 6 under the following treating conditions, results given in FIG. 9 were obtained.

Voltage of D.C. power source: 134v.
Electrostatic capacity of capacitance: 16 $\mu$f.
Resistance: 11 $\Omega$
Self-inductance: 5~500 $\mu$H.
Treating electrode {Material: mild steel
size: 30 mm. wide and 50 mm. long
Roll {material: soft cast iron
diameter: 860 mm.
rotational speed: 5~7 r.p.m.

Under the conditions set forth above, experiments were carried out by varying the self-inductance to vary the value $\alpha$ of discharge current peak value/ discharge duration. As apparent in FIG. 9, it will be seen that in case where the $\alpha$ is not less than 0.1 A/$\mu$S the electrode consumption rate, namely (the percentage of) wear on treating electrode in weight/ wear on roll in weight is not more than 95 percent and if the $\alpha$ is 6 A/$\mu$S, the electrode consumption rate is 25 percent. The treatment of the roll surface thus being chiefly effected. Marked wear on the treating electrode is by no means desirable from the view point of carrying out economical and efficient treatment. In treating the roll surface, therefore, it is preferable to employ a discharge current which is not lower than 0.1 A/$\mu$S, especially not lower than 0.2 A/$\mu$S.

Figure 5:
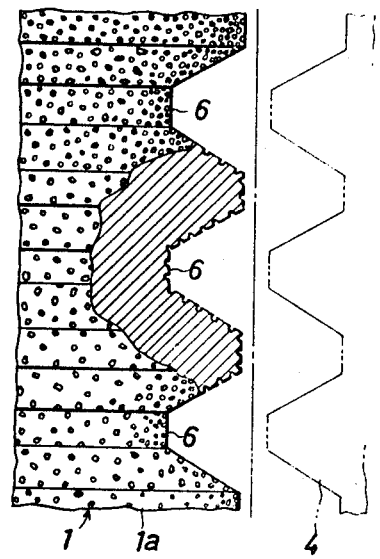
FIG. 5 is a fragmentary plan view on an enlarged scale showing a satin-finished roll with part broken away and a turner plate to be machined by transference based upon the form of the roll.

FIG. 5 illustrates the satin-finished surface of the roll obtained by subjecting it to the discharge treatment described above which was carried out with $\alpha$ of 1 A/$\mu$S. The surface of the roll 1 having grooves 6 22 mm. in depth and 32 mm. in pitch is formed with a satin-finished surface of roughness of approximately 4 Hrms. m$\mu$-in. By examining the state of the surface it was found to have improved hardness up to the depth of 2 $\mu$-in. from the surface. That is to say, the result of Vickers hardness test performed under a load of 25 gr. showed that, whereas a conventional roll had HV of about 250, the roll of the present invention described above had improved HV of about 750. Remarkable improvements have also been achieved with respect to coefficient of friction, and wear-resisting and corrosion-resisting properties. As compared with a conventional roll, the coefficient of friction and wear resistance were increased by several tens of percent. When subjected to corrosion test with 5 percent nitric acid solution, the conventional roll showed corrosion resistance represented by the reduction of about 1 mg./cm.$^2$ min., whereas the example in accordance with the present invention was found to undergo a reduction of 0.1 mg./cm.$^2$ min.

In case where the value of self-inductance is increased to make the value of the discharge current not higher than 0.05 A/$\mu$S by employing the electric circuit shown in FIG. 6 The electrode consumption rate achieved is not lower than 200 percent, resulting in wear chiefly on the treating electrode. By applying this principle it has further been found out that based upon the form of the grooved sugar mill roll, the tips of the treating electrode and of the scraper and turner plate which are used with the roll can be transfer formed by electrical discharge machining. That is to say, in case where a discharge current with the discharge current peak value (A)/ discharge duration ($\mu$S) not exceeding 0.05 is produced in the electric circuit shown in FIG. 6 while the roll is being rotated, the rate of wear on the electrode achieved becomes not less than 200 percent, consumption, namely shaping being effected chiefly on the treating electrode. For example, with a tool electrode 30 mm. in width and a roll 3,000 mm. in circumference, an electrode consumption rate of 300 percent is attained when a discharge current of 0.04 A/$\mu$S is used. Suppose the density of the roll and that of the treating electrode are the same, the wear or disintegration of the roll is one three-thousandth that of the treating electrode, the treating electrode which is initially in a flat shape being worn off and machined to the shape identical with that of the roll grooves without causing deformation of the grooves on the roll surface. If a turner plate or a scraper whose forward end if initially linear as indicated in a chain line in FIG. 5 is placed in position as an anode in place of the treating electrode, the forward end will be machined to the shape of the roll grooves, namely to the projected or indented shape indicated in a solid line in the same drawing, just as seen in the case of the treating electrode. It will readily be understood that the surface thus machined has also been improved in hardness and durability the same as the roll surface.

Figure 7:
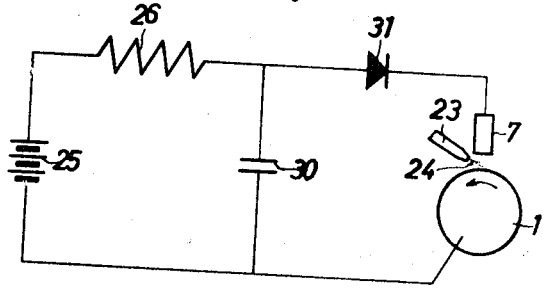
FIG. 7 is a diagram of a discharge circuit of capacitance type showing a modification of the electric circuit to be used in the electrical discharge treatment of the present invention.

The electric current shown in FIG. 7, a modification of the circuit in FIG. 6, utilizes the charging and discharging actions of a capacitance 30. In FIG. 7, numeral 31 indicates a rectifier, the other same reference numerals as in FIG. 6 designating the same constituent elements.

Figure 8:
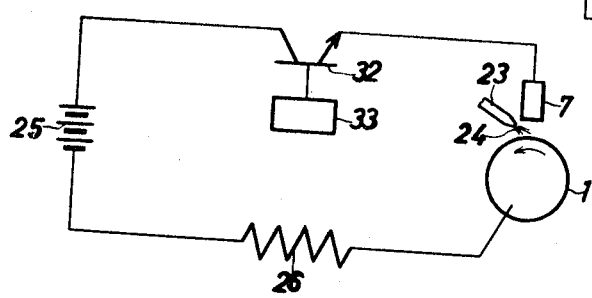
FIG. 8 is a diagram of a discharge circuit of transistor type showing another modification of the electric circuit to be used in the electrical discharge treatment of the present invention.

The electric circuit shown in FIG. 8, another modification of the circuit in FIG. 6, utilizes the switching action of a semiconductor such as a transistor 32 or thyristor. In FIG. 5, the numeral 33 indicates a pulse generator, the other reference numerals identical with those in FIG. 6 refer to the identical elements.

It will be apparent from the foregoing description that by the application of electrical discharge in water of the present invention, not only the time required for treating the surfaces of the sugar mill roll can be remarkably reduced but the durability of the roll can also be greatly improved. In addition, due to the increase in the coefficient of friction of the roll surface effected by the treatment to provide satin finish, an outstanding improvement in the efficiency of sugar juice extraction can be ensured.

In accordance with the method of electrical discharge machining of the present invention, the treating electrode provided for the roll surface can readily be obtained. Furthermore, the end portions of the scraper and turner plate to be held proximate to the roll which have so far been manufactured by conventional machining can be easily formed into the shape in conformity with the grooves on the roll with improvement in durability achieved.

What we claim is:

1. An electrical discharge apparatus comprising a generally cylindrical sugar mill roll having a plurality of axially spaced circumferential grooves, an electrode spaced apart from said roll in facing relationship therewith by a distance capable of effecting electrical discharge, means for providing water between said roll and said electrode, and an electric circuit, the roll connected to the circuit as a cathode and the electrode connected to the circuit as an anode, whereby the circuit may effect repetitive discharges between the roll and the electrode to satin-finish the surface of said roll by the discharges.

2. The electrical discharge apparatus of claim 1 wherein said electrode is provided with spaced-apart projections conforming to the grooves in the roll and indentations conforming to the surface of the roll between the grooves.

3. The electrical discharge apparatus of claim 2 wherein said electrode is a turner plate.

4. The electrical discharge apparatus of claim 2 wherein said electrode is a scraper.

5. The electrical discharge apparatus of claim 1 including a water-retaining housing disposed about the electrode and spaced from the electrode whereby water from the water-providing means may be retained in surrounding relationship with the electrode.

6. The electrical discharge apparatus of claim 5 including a holder supporting the electrode and the housing, means for advancing and retracting the holder toward and away from the roll generally perpendicularly to the axis of the roll, and means for moving the holder in a direction generally parallel to the axis of the roll.

7. An electrical discharge apparatus comprising a generally cylindrical sugar mill roll having a plurality of axially spaced circumferential grooves, an electrode spaced apart from the roll in facing relationship therewith by a distance capable of effecting electrical discharge, the electrode having spaced-apart projections conforming to the grooves in the roll and indentations conforming to the surface of the roll between the grooves, a nozzle adjacent the roll and the electrode for supplying water between the roll and the electrode, a holder supporting the electrode, a water-retaining housing supported by the holder surrounding the electrode and spaced therefrom whereby water may be retained in surrounding relationship with the electrode, means for advancing and retracting the holder toward and away from the ro generally perpendicularly to the axis of the roll, and means for moving the holder in a direction generally parallel to the axis of the roll.